US010113683B2

(12) United States Patent
Lee (10) Patent No.: US 10,113,683 B2
(45) Date of Patent: Oct. 30, 2018

(54) TRANSFER LINE FOR CRYOGENIC LIQUID

(71) Applicant: Korea Advanced Institute of Science and Technology, Daejeon (KR)

(72) Inventor: Jhinhwan Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 192 days.

(21) Appl. No.: 15/210,810

(22) Filed: Jul. 14, 2016

(65) Prior Publication Data

US 2016/0319982 A1 Nov. 3, 2016

Related U.S. Application Data

(63) Continuation of application No. PCT/KR2015/013492, filed on Dec. 10, 2015.

(30) Foreign Application Priority Data

Feb. 13, 2015 (KR) ........................ 10-2015-0022072

(51) Int. Cl.
*F16L 9/14* (2006.01)
*F16L 59/14* (2006.01)
*F16L 53/00* (2018.01)
*F16L 59/06* (2006.01)
*F16L 59/065* (2006.01)
*F16L 9/19* (2006.01)

(52) U.S. Cl.
CPC .............. *F16L 59/141* (2013.01); *F16L 9/19* (2013.01); *F16L 53/00* (2013.01); *F16L 59/06* (2013.01); *F16L 59/065* (2013.01)

(58) Field of Classification Search
CPC . F16L 59/141; F16L 9/19; F16L 53/00; F16L 59/06; F16L 59/065
USPC .......................... 138/149, 148, 137, 141, 140
See application file for complete search history.

(56) References Cited

U.S. PATENT DOCUMENTS 3,379,330 A * 4/1968 Perkins, Jr. ........... F16L 59/065
220/560.13
3,595,275 A * 7/1971 Steans ................... F16L 59/125
138/114

(Continued)

FOREIGN PATENT DOCUMENTS

JP 2602248 B2 4/1997

*Primary Examiner* — Patrick F Brinson
(74) *Attorney, Agent, or Firm* — Fenwick & West LLP (57) ABSTRACT

A transfer line includes a first conduit, a first insulation part, a first protective shield, a second conduit, a second insulation part and a second protective shield. Cryogenic liquid flows through the first conduit. The first insulation part surrounds the first conduit and has a multi-layered film structure. Film layers of the multi-layered film structure are spaced apart from each other. The first protective shield is formed with a predetermined thickness and diameter to surround the exterior of the first insulation part. Coolant for cooling the first protective shield flows through the second conduit. The second conduit is in contact with the first protective shield. The second insulation part surrounds the first protective shield and the second conduit, and has the multi-layered film structure. The second protective shield is formed with a predetermined thickness and diameter to surround the exterior of the second insulation part.

20 Claims, 7 Drawing Sheets

(56) References Cited

U.S. PATENT DOCUMENTS

| | | | | |
|---|---|---|---|---|
| 4,036,617 A | * | 7/1977 | Leonard | F16L 7/00 |
| | | | | 138/112 |
| 4,036,618 A | * | 7/1977 | Leonard | F16L 9/18 |
| | | | | 138/110 |
| 4,133,376 A | * | 1/1979 | Eilenberg | F17C 13/001 |
| | | | | 165/104.21 |
| 5,368,184 A | * | 11/1994 | Fay | B65D 90/022 |
| | | | | 138/149 |
| 2009/0145506 A1 | * | 6/2009 | Queau | F16L 39/005 |
| | | | | 138/112 |

* cited by examiner

TRANSFER LINE FOR CRYOGENIC LIQUID

CROSS-REFERENCE TO RELATED APPLICATIONS

The present application is a continuation of International Patent Application No. PCT/KR2015/013492, filed on Dec. 10, 2015, which is based upon and claims the benefit of priority to Republic of Korea Patent Application No. 10-2015-0022072, filed on Feb. 13, 2015, which are hereby incorporated by reference herein in their entirety.

TECHNICAL FIELD

The present disclosure relates to transfer of cryogenic liquid, more particularly, to a transfer line for cryogenic liquid.

BACKGROUND

Generally, cryogenic liquid refers to a material cooled and liquefied to several or tens of kelvins (K) or less, such as liquid helium (LHe), liquid nitrogen, liquid oxygen, and liquid hydrogen.

Recently, demands for cryogenic liquid are increasing in various high-tech fields such as next-generation semiconductor manufacturing technologies. In particular, helium is widely used in film deposition or the like in advanced processes for coping with a decrease in size of the geometric structure of the integrated circuits in progressive semiconductor manufacturing process.

Accordingly, as demands for cryogenic liquid such as liquid helium increase, there are suggested various methods for providing cryogenic liquid to, for example, a semiconductor manufacturing factory that is not capable of self-producing cryogenic liquid have been attempted. Among these methods, there is a method to provide cryogenic liquid through transfer lines to a number of target companies at remote places.

Meanwhile, since cryogenic liquid may be easily vaporized if it is transferred through a transfer line exposed to external heat such as radiant heat, it is highly important to insulate a transfer line through which cryogenic liquid is transferred.

To that end, various transfer lines for avoiding loss of the cryogenic liquid by external heat are suggested. The suggested transfer lines, however, may entail a loss of cryogenic liquid by radiant heat in a long distance transfer, have complex structures, and have difficulty in reducing a heat transmission rate due to adhesion effect between insulation films that surround a transfer line.

As such, there has been a growing demand for a transfer line with an improved structure that can solve the aforementioned problems, be more readily manufactured, and more efficiently block heat from the outside.

SUMMARY

In accordance with an aspect of the present disclosure, a transfer line for cryogenic liquid includes: a first conduit, a first insulation part, a first protective shield, a second conduit, a second insulation part and a second protective shield. Cryogenic liquid flows through the first conduit. The first insulation part surrounds the first conduit and has a multi-layered film structure in which film layers of the multi-layered film structure are spaced apart from each other. The first protective shield is formed with a predetermined thickness and diameter to surround the exterior of the first insulation part. Coolant for cooling the first protective shield flows through the second conduit. The second conduit is in contact with the first protective shield. The second insulation part surrounds the first protective shield and the second conduit, and has a multi-layered film structure in which film layers of the multi-layered film structure are spaced apart from each. The second protective shield is formed with a predetermined thickness and diameter to surround the exterior of the second insulation part.

In accordance with another aspect of the present disclosure, a transfer line for cryogenic liquid includes: a first conduit, a second conduit, two first insulation parts, two first protective shields, a third conduit, a second insulation part and a second protective shield. Cryogenic liquid flows through the first conduit and the second conduit. The second conduit is disposed adjacent to the first conduit. Each of the two first insulation parts have a multi-layered film structure in which film layers of the multi-layered film are spaced apart from each other, and the two first insulation parts respectively surround the first conduit and the second conduit. The two first protective shields are formed with predetermined thicknesses and diameters to surround the exteriors of the two first insulation parts, respectively. The third conduit is in contact with both of the two first protective shields, wherein a coolant for cooling the first protective shields flows through the third conduit. The second insulation part surrounds the two first protective shields and the third conduit and has a multi-layered film structure in which film layers of the multi-layered structure are spaced apart from each other. and The second protective shield is formed with a predetermined thickness and diameter to surround the exterior of the second insulation part.

In accordance with another aspect of the present disclosure, a transfer line for cryogenic liquid includes: a first conduit, a second conduit, two first insulation parts, a first protective shield, a third conduit, a second insulation part and a second protective shield. Cryogenic liquid flows through the first conduit and the second conduit. The second conduit is disposed adjacent to the first conduit, Each of the two first insulation parts have a multi-layered film structure in which film layers of the multi-layered film are spaced apart from each other, and the two first insulation parts respectively surround the first conduit and the second conduit. The first protective shield is formed with a predetermined thickness and diameter to surround the exteriors of the two first insulation parts. The third conduit is in contact with the first protective shield, wherein coolant for cooling the first protective shield flows through the third conduit. The second insulation part surrounds the first protective shield and the third conduit and has a multi-layered film structure in which film layers of the multi-layered film structure are spaced apart from each other. The second protective shield is formed with predetermined thickness and diameter to surround the exterior of the second insulation part.

DETAILED DESCRIPTION OF EMBODIMENTS

Hereinbelow, the principle of operations of the present disclosure is described with reference to the accompanying drawings. In describing the present disclosure, detailed descriptions on the well-known functions or structures may be omitted when it is determined that they may unnecessarily obscure the subject matter of the present disclosure. Further, the terms used hereinbelow are defined considering their usages in the present disclosure, it is apparent that their definitions may vary depending on the intention, custom, etc. of a user, an operator, or the like. Accordingly, their definitions should be based on the teachings as described throughout the present disclosure.

Figure 1:
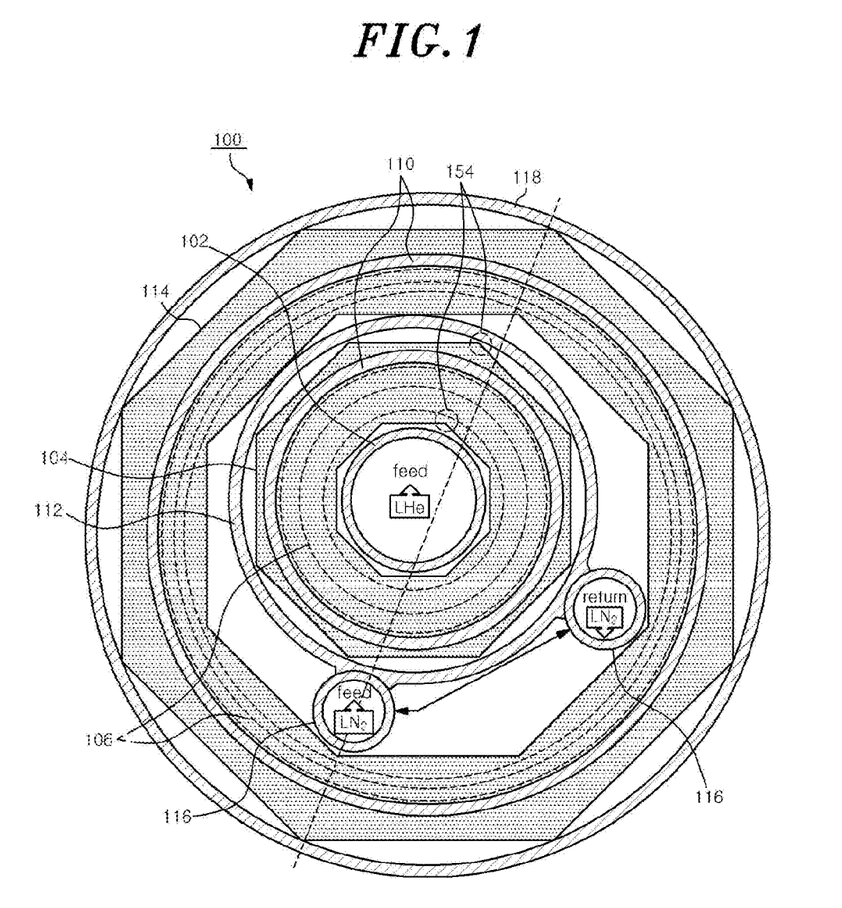
FIG. 1 is a cross section diagram of a transfer line for cryogenic liquid according to an embodiment of the present disclosure.
Figure 2:
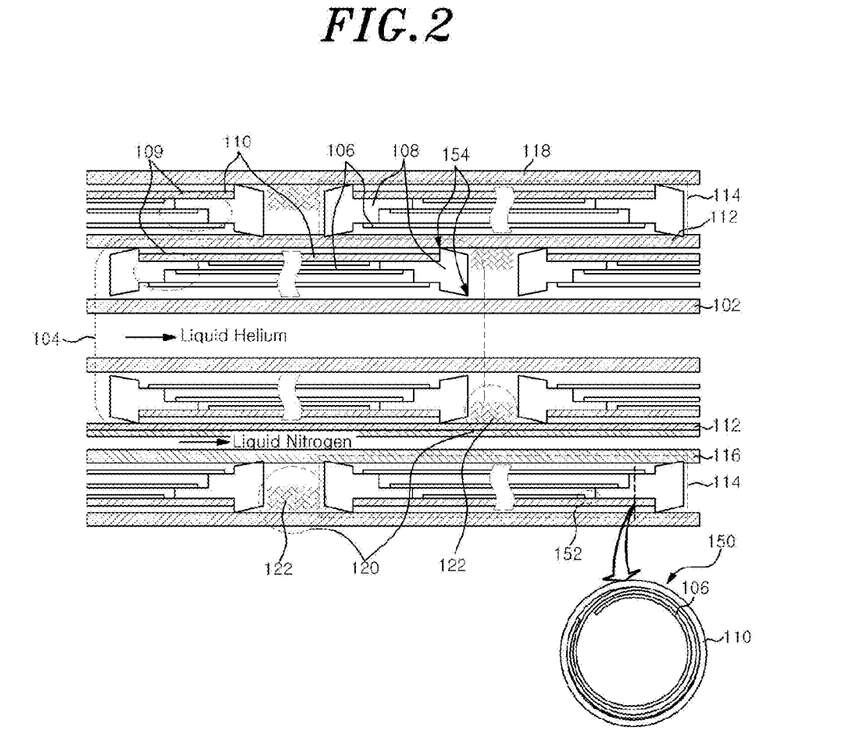
FIG. 2 is a longitudinal section diagram of a transfer line for cryogenic liquid according to one embodiment of the present disclosure.

FIGS. 1 and 2 respectively illustrate a cross section diagram and a longitudinal section diagram of a transfer line for cryogenic liquid according to an embodiment of the present disclosure.

Hereinbelow, each element of the transfer line for cryogenic liquid according to the present embodiment will be described in detail with reference to FIGS. 1 and 2.

Above all, a transfer line for cryogenic liquid 100 may comprise a first conduit 102, a first insulation part 104, a first protective shield 112, a second conduit 116, a second insulation part 114, and a second protective shield 118.

The first conduit 102 is a conduit for transferring cryogenic liquid such as liquid helium (LHe), which may be formed as a cylinder-shaped metallic pipe but not limited thereto. Further, the first conduit 102 may be formed with a diameter and a thickness corresponding to the transfer amount of cryogenic liquid as required.

The first insulation part 104 is formed to surround the first conduit 102 to thereby prevent external radiant heat from being transmitted to the first conduit 102, and may be made of a material capable of blocking transmission of radiant heat.

Further, the first insulation part 104 may comprise, as illustrated in FIG. 2, an insulation member 106 having a multi-layered film structure, supports 108 coupled to opposite ends of the insulation member 106 to support each film layer of the multi-layered film structure of the insulation member 106, and a pipe 110 surrounding the insulation member 106 and connecting the supports 108 at the opposite sides.

The insulation member 106 may be formed in a cylindrical shape with a multi-layered film structure in which flexible metallic films are multi-layered. This multi-layered film structure may be formed in a spiral shape by winding a metallic film such as aluminum thin film from the inside, as indicated by the reference numeral 150 in FIG. 2, but not limited thereto. In case of forming a multi-layered film structure by winding metallic films, etc. in a spiral shape, each layer has a property to expand towards the outside so that two adjacent layers are prevented from being adhered to each other.

Conventionally, the transmission rate at which radiant heat from the outside is transmitted to the inside of a transfer line is high due to the adhesion between adjacent layers in a multi-layered film structure. However, forming a multi-layered film in a spiral shape as in the present embodiment may avoid adhesion between the adjacent films to reduce the transmission rate of radiant heat.

The supports 108 are positioned at opposite ends of the insulation member 106, each support 108 having at one side a step-shaped connection part 109 to support each film layer in the insulation member 106. The step-shaped connection part 109 may be assembled with the insulation member 106 such that each film layer is positioned at each step of the step-shaped connection part 109. That is, as illustrated in FIG. 2, the support 108 may have the step-shaped connection part 109 at which each film layer of the insulation member 106 having a multi-layered film structure, and may be assembled to the insulation member 106 such that each film layer of the multi-layered film structure is positioned at each step of the step-shaped connection part 109. Also, the support 108 may have, at a side opposite to the side at which the step-shaped connection part is formed, an inner surface including an interior surface contacting with an adjacent conduit or protective shield and facing the first conduit 102, and an outer surface including an exterior surface contacting with an adjacent conduit or protective shield and facing a direction opposite to the inner surface. The support 108 is in contact with an adjacent protective shield or conduit through the interior surface and the exterior surface, as indicated by the reference numeral 154.

In such embodiments, the support 108 may position each film layer of the insulation member 106 to be spaced at a predetermined distance from the end of each step on the step-shaped connection part 109, as indicated by the reference numeral 152 in FIG. 2. This is for preparing for expansion of each film layer of the insulation member 106 by radiant heat or the like in case where the transfer line for cryogenic liquid 100 is exposed to the radiant heat. Providing a certain distance between the end of each step on the step-shaped connection part 109 and each film layer of the insulation member 106 placed on the corresponding step may prevent the supports 108 assembled to the insulation member 106 from being pressed and displaced by the expanded film even when the film is expanded.

Further, when the support 108 is positioned at the first insulation part 104, its interior surface is in contact with the first conduit 102 and its exterior surface is in contact with the first protective shield 112. In such embodiments, the support 108 may be formed in a shape that enables it to be in point-contact with the first conduit 102 and the first protective shield 112, as shown in FIGS. 1 and 2, to minimize the transmission rate at which radiant heat is transmitted from the outside.

Further, when the support 108 is positioned at the second insulation part 114, its interior surface is in contact with the first protective shield 112 and the second conduit 116, and its exterior surface is in contact with the second protective shield 118. In such embodiments, the support 108 may be formed in a shape that enables it to be in point-contact with the first protective shield 112, the second conduit 116, and the second protective shield 118, as shown in FIGS. 1 and 2, to minimize the transmission rate at which radiant heat is transmitted from the outside as in the first insulation part 104.

That is, for the point-contact as above, the exterior surface of the support 108 may be formed to protrude more than the pipe 110 in a radial direction and the support 108 is formed in a hollow shape with its inner and outer surfaces having a polygonal shape in a circumferential direction, for example, as indicated by the reference numeral 154 in FIGS. 1 and 2. In such embodiments, the interior and the exterior surface of the support 108 may be formed to have slopes along the longitudinal direction of the first conduit 102, but not limited thereto. Accordingly, at the first insulation part 104, the support 108 is in point-contact with the first conduit 102 and the protective shield 112 so that the transmission rate of radiant heat may be minimized, and at the second insulation part 114, the support 108 is in point-contact with the first protective shield 112, the second conduit 116, and the second protective shield 118 so that the transmission rate of radiant heat may be minimized.

Figure 3A:
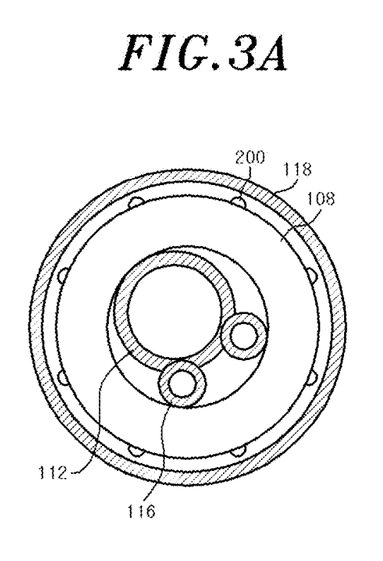
FIGS. 3A and 3B are cross section diagrams of a transfer line for cryogenic liquid according to another embodiment of the present disclosure.
Figure 3B:
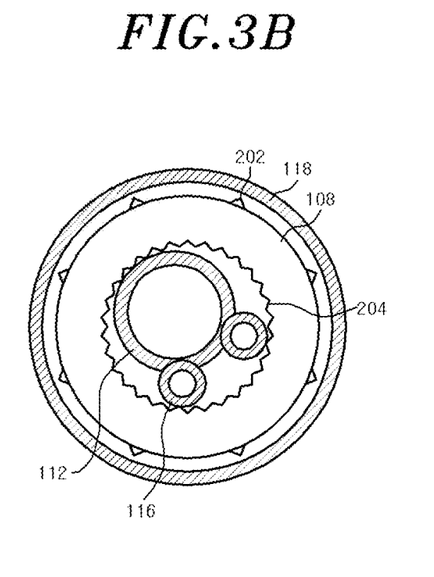

Meanwhile, the support 108 may be formed in various forms as illustrated in FIGS. 3A and 3B in accordance with other embodiments.

Referring to FIGS. 3A and 3B, the exterior surface of the support 108 protrudes more than the pipe 110 in a radial direction, and is formed in a hollow shape with its inner and the outer surfaces having a cylindrical shape in a circumferential direction, as shown in FIG. 3A. Further, projection parts 200 may be formed at the outer surface of the support 108 while being spaced at regular intervals. The projection parts 200 formed as described above may reduce a contact surface between the support 108 and the second protective shield 118 to thereby minimize the transmission rate at which radiant heat from the outside applied to the second protective shield 118 is transmitted to the inside of the transfer line for cryogenic liquid 100.

In such embodiments, wherein the projection parts 200 formed at the outer surface of the support 108 for reducing a contact surface with the second protective shield 118 may be formed to have a cross section in a semicircular shape, as shown in FIG. 3A, or a cross section in a triangular shape, as shown in FIG. 3B, but not limited thereto.

Moreover, the exterior surface of the support 108 may protrude more than the pipe 110 in a radial direction, and is formed in a hollow shape with its inner and outer surfaces having a cylindrical shape in a circumferential direction, as shown in FIG. 3B. Further, projection parts 202 having cross sections in a triangular shape may be formed at the outer surface of the support 108 while being spaced at regular intervals, and the inner surface may be formed, e.g., in a saw-tooth shape as indicated by the reference numeral 204, but not limited thereto.

The projection parts 202 formed at the outer surface may reduce the contact surface between the support 108 and the second protective shield 118, which minimizes the transmission rate of the radiant heat from the outside applied to the second protective shield 118 to the inside of the transfer line for cryogenic liquid 100. Further, the saw-tooth shapes formed at the inner surface may reduce the contact surface between the support 108 and the first protection 112 as well as the second conduit 116, which minimizes the transmission rate at which the radiant heat transmitted to the support 108 in the second insulation part 114 is transmitted to the first protective shield 112 or the second conduit 116.

Subsequently, descriptions on the elements of the transfer line for cryogenic liquid 100 as illustrated in FIGS. 1 and 2 will be continued.

The first protective shield 112, which is formed to surround the exterior of the first insulation part 104, may be made of a material capable of blocking the transmission of radiant heat such as a metallic material, but not limited thereto.

Further, the first protective shield 112 may be configured to be in contact with the second conduit 116 through which coolant flows so that it is cooled by the coolant and kept in a low temperature state, and thereby minimize the transmission of radiant heat from the outside to the inside of the first conduit 102, etc.

The second conduit 116 may be a conduit through which coolant such as $N_2$ for cooling the first protective shield 112 flows and be formed as a cylindrical-shaped conduit made of metallic material, but not limited thereto. Further, the second conduit 116 may be formed with a diameter and a thickness corresponding to the transfer amount of cryogenic liquid as required. Moreover, the second conduit 116 may be kept in a low temperature state by the coolant to cool the first protective shield 112 in contact with the second conduit 116.

In addition, the second conduit 116 may be formed as two conduits in contact with the first protective shield 112 wherein one conduit is used as a conduit for feeding the coolant and the other conduit is used as a conduit for returning the coolant, but not limited thereto.

The second insulation part 114 is a component which surrounds the first protective shield 112 and the second conduit 116 to prevent the external radiant heat from being transmitted to the first protective shield 112 and the second conduit 116, and may be made of a material capable of blocking the transmission of radiant heat.

Further, the second insulation part 114, like the first insulation part 112, may comprise an insulation member 106, a support 108, and a pipe 110, as illustrated in FIG. 2.

In such embodiments, the configurations of the components in the second insulation part 114, i.e., the insulation member 106, the support 108, and the pipe 110, are the same as those of the components of the first insulation part 104 and the conjunctive relationships between the respective components and the functions thereof are the same as well. Accordingly, more detailed descriptions thereon will be omitted.

The second protective shield 118, which surrounds the exterior of the second insulation part 114, may be made of a material capable of blocking the transmission of radiant heat such as a metallic material, but not limited thereto.

Intermediate connection members 120 may be positioned in the space adjacent the respective first insulation parts 104 and in the space between the adjacent second insulation parts 114, while linking a number of the first insulation parts 104 or the second insulation parts 114 to each other, to perform a function of preventing the radiant heat from the outside from penetrating into the transfer line 100 through the spaces.

Figure 4:
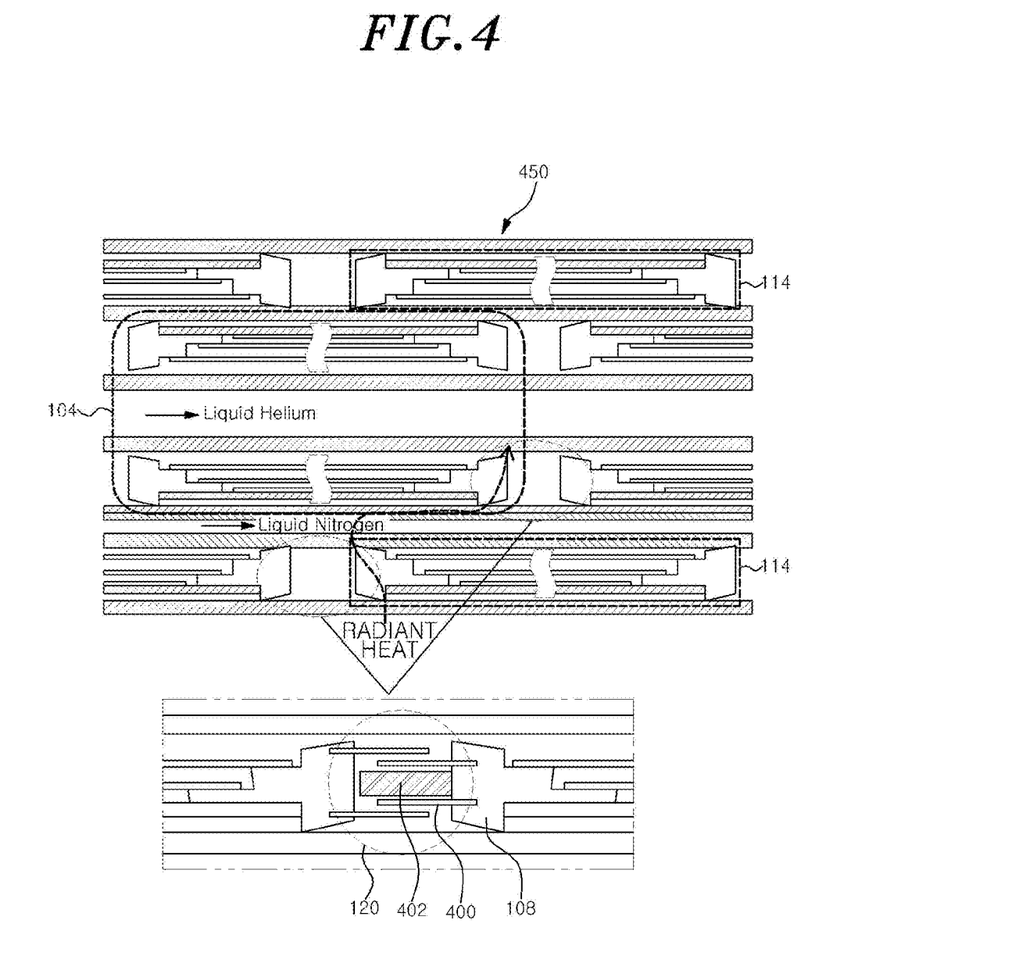
FIG. 4 is a detailed configuration diagram of an intermediate connection member of the transfer line for cryogenic liquid shown in FIG. 1.

The intermediate connection member 120 may comprise a soft spacer ring as illustrated in FIG. 2, or comprise a structure with metallic cylinders 400 and an elastic member 402 as illustrated in FIG. 4.

Referring to FIG. 4, the intermediate connection member 120 having the metallic cylinders 400 and the elastic member 402 will be described in more detail.

First, the metallic cylinders 400 may be assembled to the respective supports 108 opposing to each other through the respective spaces between the adjacent first or second insulation parts 104 or 114, each of the metallic cylinders 400 extending for each support 108 into the corresponding space. In such embodiments, the metallic cylinders 400 may be configured such that the metallic cylinders with different diameters are respectively attached to the two opposite supports, but not limited thereto. For example, the metallic cylinders 400 may be attached to only one support 108 of the two opposing supports 108.

The elastic member 402 may be coupled to one of the opposing supports 108 in the metallic cylinders 400 to extend toward the other support 108. For example, a spring may be used as the elastic member 402, but not limited thereto.

In such embodiments, each of the metallic cylinders 400 may be configured to extend from the support 108 at which corresponding the metallic cylinder 400 is attached toward the opposing support 108, and may be spaced by a distance from the opposing support 108. This is to prepare for expansion of the first or second insulation parts 104 or 114 by radiant heat or the like in case where the transfer line for cryogenic liquid 100 is exposed to the radiant heat, and to prevent the first or second insulation parts 104 or 114 from pressing the opposing first or second insulation parts 104 or 114 even when expanded.

Further, the first insulation part 104 and the second insulation part 114 may be provided in a form of a number of modules, which are to be linked to each other, according to the length of the first conduit 102, as indicated by the reference numeral 450 in FIG. 4.

In case where the first insulation part 104 and the second insulation part 114 are modularized, the modularized first or second insulation parts 104 or 114 may be simply linked consecutively to extend in a length corresponding to that of the first conduit 102. In case where the first insulation part 104 and the second insulation part 114 are modularized, each of the first insulation part 104 and the second insulation part 114 may be modularized to, for example, a length of 10 cm to 5 m, but not limited thereto.

Further, in case where the first insulation part 104 and the second insulation part 114 are modularized, as indicated by the reference numeral 450 in FIG. 4, the intermediate connection member 120 positioned between the adjacent first insulation parts 104 and the intermediate connection member 120 positioned between the adjacent second insulation parts 114 may be arranged offset from each other along the longitudinal direction of the first conduit 102. That is, the first insulation part 104 and the second insulation part 114 may be arranged alternately with each other along the longitudinal direction of the first conduit 102. In case where the first insulation part 104 and the second insulation part 114 are modularized, the flow of radiant heat is hindered and a transmission path of heat toward the first conduit 102 is extended as long as possible so that the first conduit 102 is more efficiently insulated, as indicated by the reference numeral 450 in FIG. 4.

Figure 5:
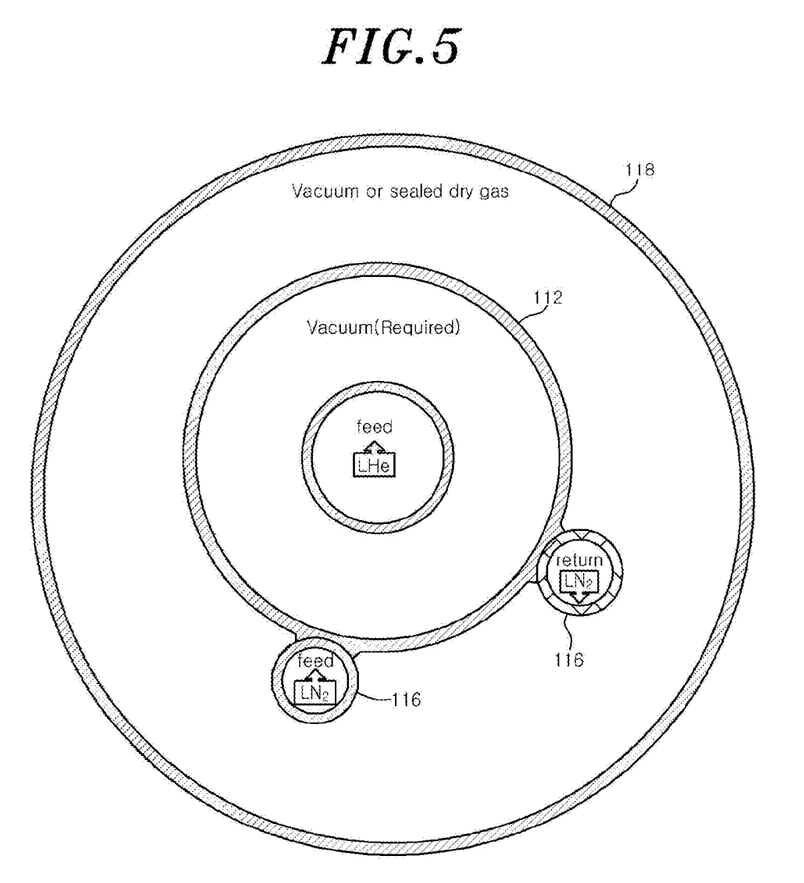
FIG. 5 is an exemplary diagram of the vacuum state inside the transfer line for cryogenic liquid shown in FIG. 1.

Meanwhile, it may be desirable that the space between the first conduit 102 and the first protective shield 112 is kept in a vacuum state as shown in FIG. 5, and that the space between the first protective shield 112 and the second protective shield 118 is kept in a vacuum state or filled with a particular sealed dry gas, but not limited thereto.

Figure 6:
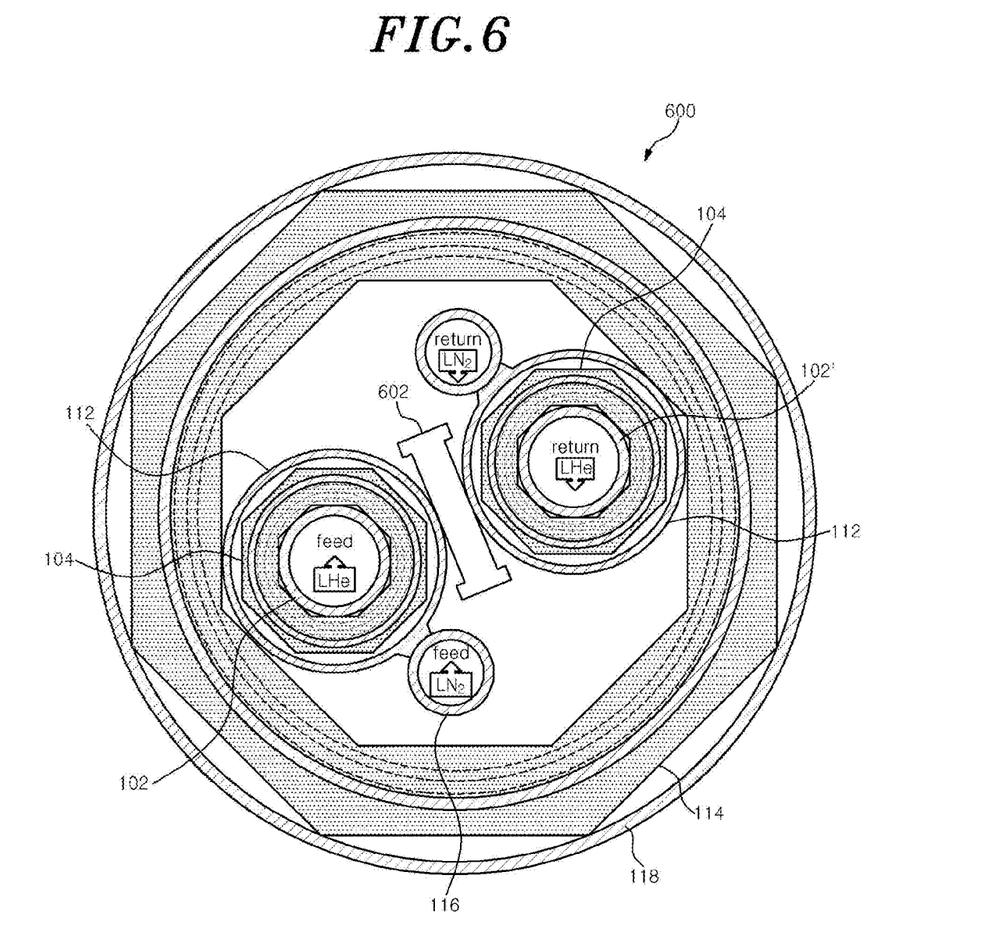
FIGS. 6 and 7 are cross section diagrams of transfer lines for cryogenic liquid according to other embodiments of the present disclosure.
Figure 7:
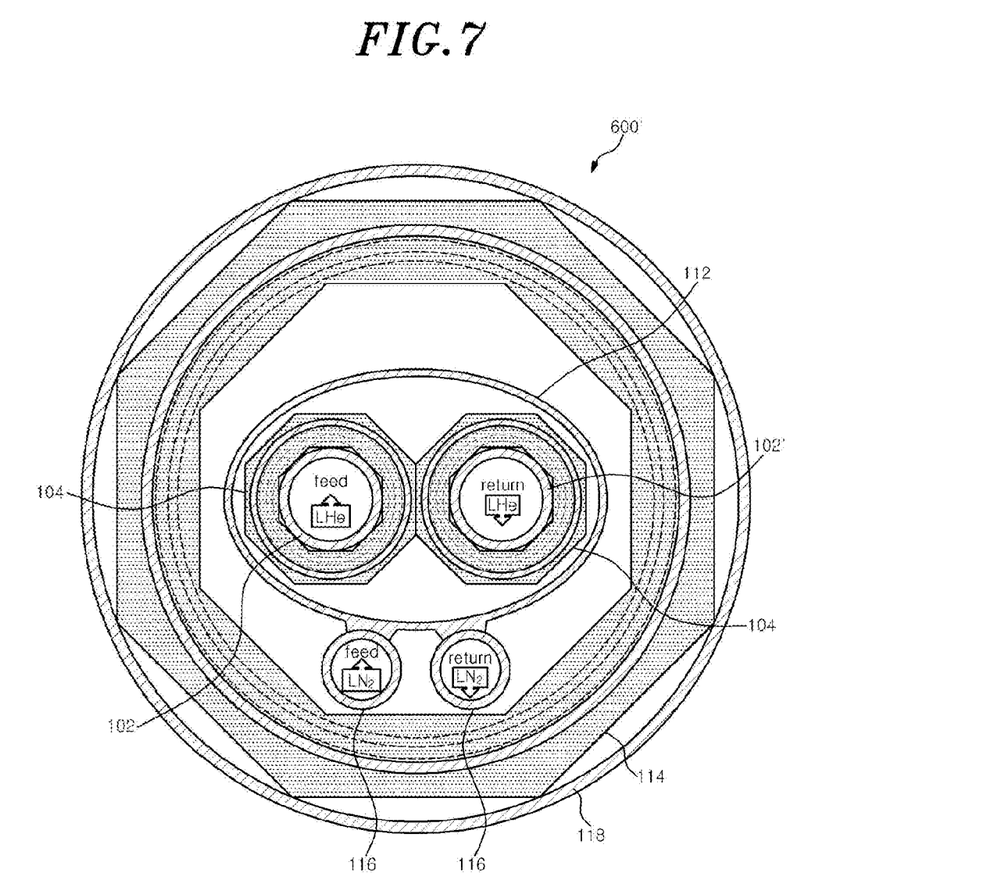

FIGS. 6 and 7 illustrate cross section diagrams of transfer lines for cryogenic liquid according to other embodiments of the present disclosure.

First, referring to the configuration of a transfer line for cryogenic liquid 600 illustrated in FIG. 6, in comparison with FIG. 1, the transfer line for cryogenic liquid illustrated in FIG. 6 is configured to include two conduits for transferring cryogenic liquid, i.e., a first conduit 102 and a second conduit 102'.

That is, in the embodiment illustrated in FIG. 6, as two conduits are provided to transfer cryogenic liquid such as liquid helium, the first insulation part 104 is required to both the first conduit 102 and the second conduit 102' for primarily insulating each of the first conduit 102 and the second conduit 102', and thus, two first insulation parts 104 are provided.

In addition, two first protective shields 112 may be formed to respectively surround the respective first insulation parts 104, and third conduits 116, through which coolant for cooling the respective first protective shields 112 flows, may be formed to respectively be in contact with the respective first protective shields 112.

Further, a heat barrier 602 for preventing heat transfer may be installed between the first protective shield 112 surrounding the first conduit 102 and the second protective shield 112 surrounding the second conduit 102'. In such embodiments of providing two conduits for transferring cryogenic liquid, the first conduit 102 may be used as a conduit for feeding the cryogenic liquid and the second conduit 102' may be used as a conduit for returning the cryogenic liquid fed in the first conduit 102. In such cases, since the second conduit 102' may be at a higher temperature relative to the first conduit 102 and a heat transfer may occur therebetween, the heat barrier 602 may be installed to prevent such a heat transfer.

Next, referring to the configuration of a transfer line for cryogenic liquid 600' illustrated in FIG. 7, like FIG. 6, the transfer line for cryogenic liquid 600' illustrated in FIG. 7 is configured to include two conduits for transferring cryogenic liquid, the first conduit 102 and the second conduit 102'. However, unlike FIG. 6, the heat barrier is not provided between the first conduit 102 and the second conduit 102', and the first conduit 102 and the second conduit 102' are surrounded by one first protective shield 112.

That is, in the embodiment illustrated in FIG. 7, like FIG. 6, the first insulation part 104 is required to both of the first conduit 102 and the second conduit 102', and thus, two first insulation parts 104 are provided. In addition, the third conduits 116, through which coolants for cooling the first protective shield 112 flow, may be formed to be in contact with the first protective shield 112 which is formed to surround both of the first conduit 102 and the second conduit 102'.

Further, in such embodiments of providing two conduits for transferring cryogenic liquid, the first conduit 102 may be used as a conduit for feeding the cryogenic liquid and the second conduit 102' may be used as a conduit for returning the cryogenic liquid fed in the first conduit 102. In such cases, since the second conduit 102' may be at a higher temperature relative to the first conduit 102, a heat transfer may occur therebetween. Accordingly, it is required to block the heat transfer between the first conduit 102 and the second conduit 102'.

For the purpose of the above, the heat barrier 602 is installed in the embodiment illustrated in FIG. 6, whereas, unlike the embodiment of FIG. 6, that of FIG. 7 uses a film of superinsulation material for the insulation member 700 in the first insulation part 104 surrounding the second conduit 102', instead of forming the heat barrier 602 between the first conduit 102 and the second conduit 102', and thereby can block a heat transfer with a simpler constitution.

As described above, according to the present disclosure, the transfer line for cryogenic liquid insulates a conduit through which cryogenic liquid is transferred using insulation films each having multi-layered film structures in which each film of the multi-layered film structure is spaced at regular intervals by a step-shaped support, wherein the insulation films surround the conduit in multiple layers, while the inner insulation film and the outer insulation film are disposed offset from each other along the longitudinal direction of the conduit to extend the transmission path of the heat transmitted from the outside to the inside of the transfer line as long as possible, and thereby allowing more efficient insulation.

Meanwhile, the present disclosure describes the specific embodiments, various modifications may be made without departing from the subject matter of the present disclosure. Therefore, the protection scope of the present disclosure is not limited to the embodiments as described above, but should be construed by the appended claims.

What is claimed is:

1. A transfer line for cryogenic liquid comprising:
   a first conduit through which cryogenic liquid flows;
   a first insulation part surrounding the first conduit and having a multi-layered film structure in which film layers are spaced apart from each other;
   a first protective shield formed with a predetermined thickness and a predetermined diameter to surround an exterior of the first insulation part;
   a second conduit through which a coolant for cooling the first protective shield flows, the second conduit being in contact with the first protective shield;
   a second insulation part surrounding the first protective shield and the second conduit and having a multi-layered film structure in which film layers are spaced apart from each other; and
   a second protective shield formed with a predetermined thickness and a predetermined diameter to surround the exterior of the second insulation part,
   wherein each of the first insulation part and the second insulation part comprises an insulation member including the multi-layered film structure, and
   wherein the film layers are spirally wound and lengths of the film layers in a longitudinal direction of the first conduit are different from each other.

2. The transfer line for cryogenic liquid of claim 1, wherein each of the first insulation part and the second insulation part further comprises:
   supports configured to be positioned at opposite ends of the insulation member, said each of the supports including a step-shaped connection part formed at one side of said each of the supports to support the film layers, the supports being assembled to the insulation member such that each film layer is positioned at each step of the step-shaped connection part; and
   a pipe connecting the supports positioned at the opposite ends of the insulation member, the pipe surrounding the exterior of the insulation member.

3. The transfer line for cryogenic liquid of claim 2, wherein the supports are assembled to the insulation member such that said each film layer is spaced at a predetermined distance from an end of said each step of the step-shaped connection part.

4. The transfer line for cryogenic liquid of claim 2,
   wherein said each of the supports has, at a side opposite to the one side at which the step-shaped connection part is formed, an inner surface facing the first conduit and having an interior surface which contacts with an adjacent conduit or an adjacent protective shield, and an outer surface facing a direction opposite to the inner surface and having an exterior surface which contacts with an adjacent conduit or an adjacent protective shield, and
   wherein, in the first insulation part, the interior surface is in point-contact with the first conduit and the exterior surface is in point-contact with the first protective shield.

5. The transfer line for cryogenic liquid of claim 4, wherein, in the second insulation part, the interior surface is in point-contact with the first protective shield and the second conduit, and the exterior surface is in point-contact with the second protective shield.

6. The transfer line for cryogenic liquid of claim 4, wherein the exterior surface protrudes more than the pipe in a radial direction of the first conduit, and the inner surface and the outer surface have a polygonal shape in a circumferential direction of the first conduit.

7. The transfer line for cryogenic liquid of claim 4, wherein each of the inner surface and the outer surface comprises a slope along the longitudinal direction of the first conduit.

8. The transfer line for cryogenic liquid of claim 4,
   wherein the exterior surface protrudes more than the pipe in a radial direction of the first conduit, and each of the inner surface and the outer surface has a cylindrical shape in a circumferential direction of the first conduit, and
   wherein the outer surface includes projection parts for reducing a contacting surface with the first or second protective shield, the projection parts being spaced apart from each other.

9. The transfer line for cryogenic liquid of claim 2,
   wherein a number of the first insulation parts are disposed in a longitudinal direction of the first conduit, the number of the first insulation parts is determined in accordance with a length of the first conduit,
   a number of the second insulation parts are disposed in the longitudinal direction of the first conduit, the number of the second insulation parts is determined in accordance with the length of the first conduit, and
   wherein an intermediate connection member is disposed in a space between an adjacent first insulation parts and in a space between an adjacent second insulation parts.

10. The transfer line for cryogenic liquid of claim 9, wherein the intermediate connection member comprises:
    a metallic cylinder configured to be coupled to one of the supports facing each other in the space between the adjacent first insulation parts or the space between the adjacent second insulation parts, and configured to extend in the space toward the other of the supports facing each other; and
    an elastic member positioned within the metallic cylinder, the elastic member being coupled to said one of the supports facing each other, and extending toward the other of the supports facing each other.

11. The transfer line for cryogenic liquid of claim 9, wherein the intermediate connection member comprises a soft spacer ring fit in to the space between the adjacent first or second insulation parts.

12. The transfer line for cryogenic liquid of claim 9, wherein the intermediate connection member disposed in the space between the adjacent first insulation parts and the intermediate connection member disposed in the space between the adjacent second insulation parts are arranged offset from each other along the longitudinal direction of the first conduit.

13. The transfer line for cryogenic liquid of claim 1, wherein the second conduit comprises two conduits spaced apart from each other, and one of the two conduits is used as a conduit for feeding the coolant and the other of the two conduits is used as a conduit for returning the fed-in coolant.

14. The transfer line for cryogenic liquid of claim 1,
    wherein a space between the first conduit and the first protective shield is kept in a vacuum state, and wherein a space between the first protective shield and the second protective shield is kept in a vacuum state or filled with a gas for sealing.

15. A transfer line for cryogenic liquid comprising:
a first conduit through which cryogenic liquid flows;
a second conduit through which the cryogenic liquid flows, the second conduit being disposed adjacent to the first conduit;
two first insulation parts, each having a multi-layered film structure in which film layers are spaced apart from each other, the two first insulation parts respectively surrounding the first conduit and the second conduit;
two first protective shields formed with predetermined thicknesses and predetermined diameters to surround the exteriors of the two first insulation parts respectively;
a third conduit in contact with both of the two first protective shields, wherein a coolant for cooling the two first protective shields flows through the third conduit;
a second insulation part surrounding the two first protective shields and the third conduit, the second insulation part having a multi-layered film structure in which film layers of the multi-layered film structure are spaced apart from each other; and
a second protective shield formed with a predetermined thickness and a predetermined diameter to surround the exterior of the second insulation part.

16. The transfer line for cryogenic liquid of claim 15, further comprising a heat barrier installed between the first conduit and the second conduit and configured to prevent heat transfer.

17. The transfer line for cryogenic liquid of claim 15, wherein the first conduit is used as an inlet conduit of the cryogenic liquid and the second conduit is used as an outlet conduit of the cryogenic liquid fed through the first conduit.

18. A transfer line for cryogenic liquid comprising:
a first conduit through which cryogenic liquid flows;
a second conduit through which the cryogenic liquid flows, the second conduit being disposed adjacent to the first conduit;
two first insulation parts, each having a multi-layered film structure in which film layers are spaced apart from each other, the two first insulation parts respectively surrounding the first conduit and the second conduit;
a first protective shield formed with a predetermined thickness and a predetermined diameter to surround the exteriors of the two first insulation parts;
a third conduit through which a coolant for cooling the first protective shield flows, the third conduit being in contact with the first protective shield;
a second insulation part surrounding the first protective shield and the third conduit, the second insulation part having a multi-layered film structure in which film layers are spaced apart from each other; and
a second protective shield formed with a predetermined thickness and a predetermined diameter to surround the exterior of the second insulation part.

19. The transfer line for cryogenic liquid of claim 18, wherein the first conduit is used as an inlet conduit of the cryogenic liquid and the second conduit is used as an outlet conduit of the cryogenic liquid fed through the first conduit.

20. The transfer line for cryogenic liquid of claim 19,
wherein the first insulation part surrounding the second conduit includes an insulation member formed in a multi-layered film structure, and
wherein the insulation member is made of a superinsulation material.

* * * * *